INVENTORS
JOSEPH S. HAWKES
BY WILLIAM M. SANDERSON
ATTORNEY

May 16, 1961 J. S. HAWKES ET AL 2,983,954
METHOD AND APPARATUS FOR MAKING DIAPHRAGMS
Filed Feb. 8, 1955 5 Sheets-Sheet 3

INVENTOR.
JOSEPH S. HAWKES
BY WILLIAM M. SANDERSON
ATTORNEY

INVENTOR.
JOSEPH S. HAWKES
BY WILLIAM M. SANDERSON

R.L. Miller
ATTORNEY

May 16, 1961 J. S. HAWKES ET AL 2,983,954
METHOD AND APPARATUS FOR MAKING DIAPHRAGMS
Filed Feb. 8, 1955 5 Sheets-Sheet 5

INVENTOR.
JOSEPH S. HAWKES
BY WILLIAM M. SANDERSON
ATTORNEY

United States Patent Office 2,983,954
Patented May 16, 1961

2,983,954
METHOD AND APPARATUS FOR MAKING DIAPHRAGMS

Joseph S. Hawkes and William M. Sanderson, Cuyahoga Falls, Ohio, assignors to The Goodyear Tire & Rubber Company, Akron, Ohio, a corporation of Ohio Filed Feb. 8, 1955, Ser. No. 486,846

14 Claims. (Cl. 18—17)

The present invention relates to the art of making diaphragms for use with tubeless tires or for making an ordinary tire tubeless. The main body of such diaphragms normally either serve as a liner for the inside of a tire carcass or are of substantially smaller size than the tire carcass so as to divide the tire into two chambers. Thus, in the latter case, if there is a failure of the tire, the diaphragm will act as a safety device to hold air for a sufficient period of time to permit the vehicle using the tire to be brought to a safe stop.

Integrally formed with the main body of the diaphragm which is arranged within the tire, are lateral extensions which extend under the beads of the tire and then radially outward along the outer surfaces of the tire to form channels to receive the tire beads and hold the diaphragm in position when mounted on a rim. These radial portions must have a sufficient coating of rubber to seal off the end of the fabric plies so that they are not exposed to the atmosphere externally of the tire and for effecting an air seal between the beads and the rim, particularly between the outer surface of the bead and the adjacent radial rim flange on a rim.

The present invention has for its object the provision of a simple and efficient method and apparatus for effecting the building and shaping of such a diaphragm so that the ultimate product assuredly will have the necessary properties within rather close tolerances.

Another object of the invention is to provide a curing mold for the diaphragm adapted to utilize, as part of the mold channel forming rings that are employed in giving the initial shape to the diaphragm prior to the molding thereof.

Other objects of this invention will appear hereinafter as the description thereof proceeds, the novel arrangements, features and combinations being clearly set forth in the description and in the appended claims.

Figures 1, 3, 4:
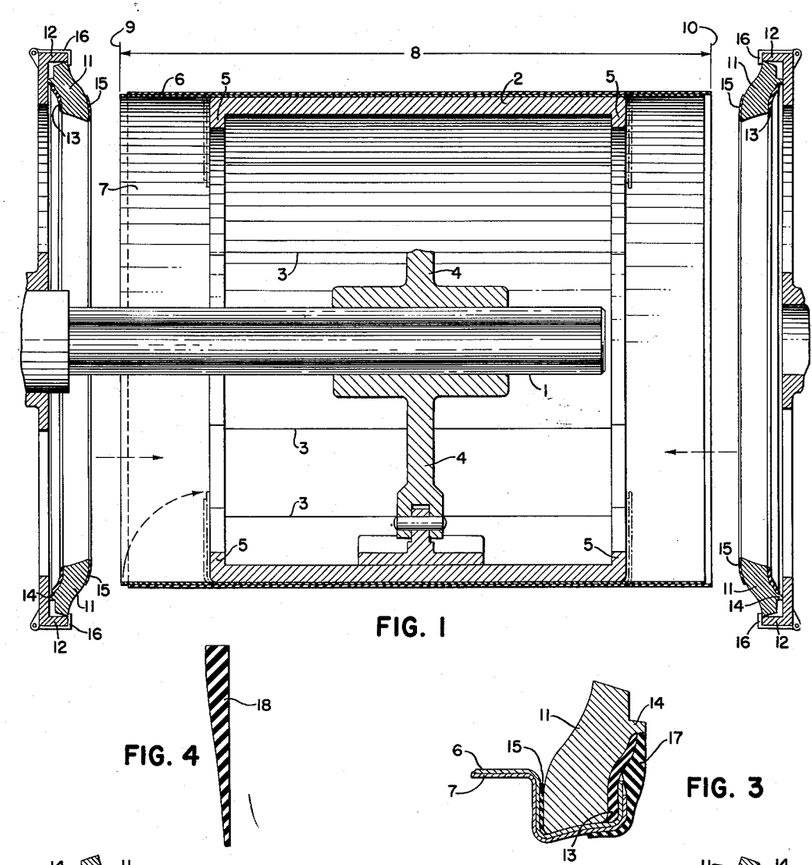
Fig. 1 illustrates schematically an apparatus utilized in the preliminary building operations.
Fig. 3 is an enlarged cross section of the channel-forming ring with coatings applied thereto prior to being mounted as in the position shown in Fig. 1.
Fig. 4 is a cross section through a rubber strip that is applied as shown in Fig. 5.

In Fig. 1 of the drawings there is illustrated schematically a tire-building drum shaft 1 on which a tire-building drum 2 is mounted for rotation with the shaft 1, as in the ordinary tire-building apparatus. The drum is formed as a cylinder made up of a number of segments which can be collapsed to reduce the overall diameter of the drum to permit removal of the product from the drum. The construction of such a drum is not shown in the drawings in order to simplify the drawings and as here illustrated is merely shown as a drum having a series of segments meeting along the lines 3 with a central support 4 here shown without the means for permitting collapse of the sections. However, it is to be understood that this drum as illustrated is of a conventional type such as used for the building of tires and well understood by those skilled in the art. The important thing is that the surface of the drum when in its expanded state is formed so that the outer surface is cylindrical and this outer cylindrical surface is provided at its outer lateral edges with depending flanges 5 arranged in or substantially in a radial plane perpendicular to the axis of the shaft 1.

The first step in the building of the diaphragm is the laying on the drum of a ply or plies of fabric which form reinforcement for the diaphragm. In the form of the invention illustrated, two plies 6 and 7 are mounted on the outer surface of the drum, each lapped to form cylindrical bands, as in the normal flat-band building of tires. Preferably the fabric is cord fabric in which the angle of the cords forms a substantial angle to the circumferential center line of the drum, as well as to a line longitudinally of the drum parallel to the axis. Each ply is laid up at an opposite angle as in the normal tire-building construction in order to give proper strength to the resulting product in a manner which is well understood in the art.

It is important, as will appear hereinafter, to control the distance 8 between the outer edges of the fabric laid on the drum and it is preferred that, when using two plies of fabric, the width of the plies are slightly less than the distance 8 so that the first ply can be laid on the drum with the left edge thereof along the control line 9. The right-hand edge thereof will then extend short of the control line 10 as illustrated. The second ply 6 is then laid up so that the right-hand edge thereof is at the control line 10 and the left-hand edge falls slightly short of the control line 9 so that the finished diaphragm is of an overall width equal to the distance 8. To control the laying of the fabric plies in this manner, suitable guides for guiding the fabric onto the drum are employed, as is common in the building of tires.

Figure 2:
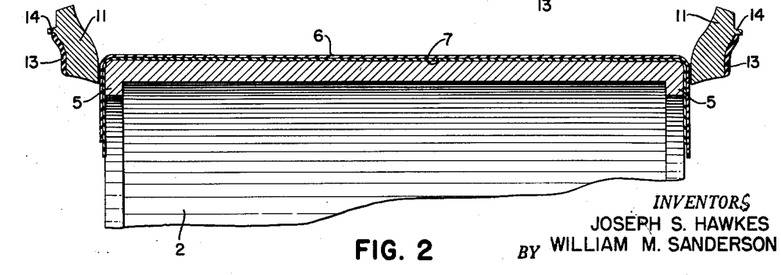
Fig. 2 is a fragmentary view of part of the apparatus shown in Fig. 1 illustrating a subsequent operation.

The next step in the operation is for the operator to swab down the ends of the fabric projecting beyond the ends of the drum into the dotted-line positions shown in Fig. 1 and as shown in full lines in Fig. 2. Due to the lightness of the fabric usually employed, it is sufficient for the operator to do this manually, although it is within the scope of the invention for this operation to be accomplished by suitable stitching wheels or the like. After the ends of the fabric have been swabbed down, as in Fig. 1, the diaphragm is ready for the next step shown in Fig. 2. However, previously two channel-forming rings 11, carried by mounting rings 12 of any suitable construction, are prepared with coated surfaces previous to their mounting in the rings 12, as illustrated by the enlarged cross section in Fig. 3. On the outside of the ring is a layer of calendered gum rubber 13 of a thickness about .040" and this rubber extends from the lower edge of the ring to a shoulder 14 formed on the outer surface of the ring. On the inner surface of the ring a layer of suitable cement 15 is applied with a brush, or in any other manner, to provide a tacky surface for a purpose which will appear presently.

Figure 5:
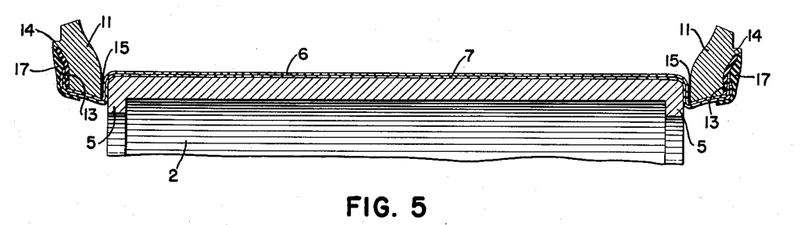
Fig. 5 is a view similar to Fig. 2 showing a successive step in the operation.

The base and outer surface may also, and preferably are, cemented to hold the gum strips in place and also to hold the fabric against the base of the ring when wrapped about the ring as in Fig. 5.

When the rings 11 have been so prepared they are mounted in the mounting rings 12 as illustrated clearly in Fig. 1. These mounting rings are then moved axially of the drum toward the ends thereof to bring the rings 11 into the positions shown in Fig. 2, after which the mounting rings are moved outwardly in an axial direction away from the drum, leaving the channel-forming ring 11 cemented to the turned-down portions of the fabric.

Figure 12:
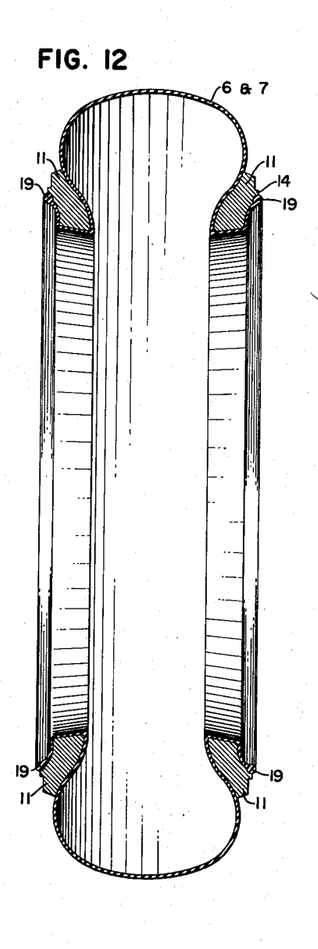
Fig. 12 shows the diaphragm and channel-forming rings as they appear when removed from the mold.

The operator then turns the ends of the fabric outwardly in an axial direction against the bases of the channel-forming rings 11 and then radially outwardly into contact with the gum strips 13 provided on the outer surfaces of the rings as illustrated in Fig. 5. The next step is to apply rubber strips on the exposed outer surfaces of the gum strips and the turned-up edges of the band. Such a strip is illustrated at 17 in Fig. 5. This strip is an extruded strip which preferably has a thickened portion at or near the shoulder 14 on the channel-forming ring 11. As illustrated in Fig. 5, it will be noted that the thickened portion is just above the ends of the plies, whereas in Fig. 4 a similar strip 18 is shown with the thickened portion near the upper edge thereof. The purpose of this thickened portion, whether formed as in Fig. 5 or as in Fig. 4, is to insure a sufficient quantity of rubber above the ends of the plies so that in the molding operation the ends of the plies will be sealed by a sufficient quantity of rubber and the rubber will be caused (due to the shape of the mold) to move outwardly to form the enlargement on the outer edge of the diaphragm shown in Fig. 12 at 19, as will be described more fully hereinafter. For this reason the strips 17 or 18 are formed by extruding the material through an extruding die.

It will be noted in Fig. 5 why it is desired to control the position of the edges of the plies when mounting them on the drum in Fig. 1. The reason is that these plies should extend far enough upwardly into the outer turned-up edges of the diaphragm so that when the diaphragm is mounted on a tire and rim there will be sufficient material between the bead of the tire and the rim flange to hold the diaphragm to resist the pulling action on the diaphragm from within the tire, as in the case of a blow-out which results from the drop in pressure within the tire outside the diaphragm. It is also important to have a sufficient quantity of rubber about the ends of the fabric so that there cannot be any leakage of the air from within the tire past the beads of the tire.

Of course it is to be understood that the fabric is coated with a suitable rubber or synthetic rubber compound in a manner well understood in the art with reference to tire building.

Figure 6:
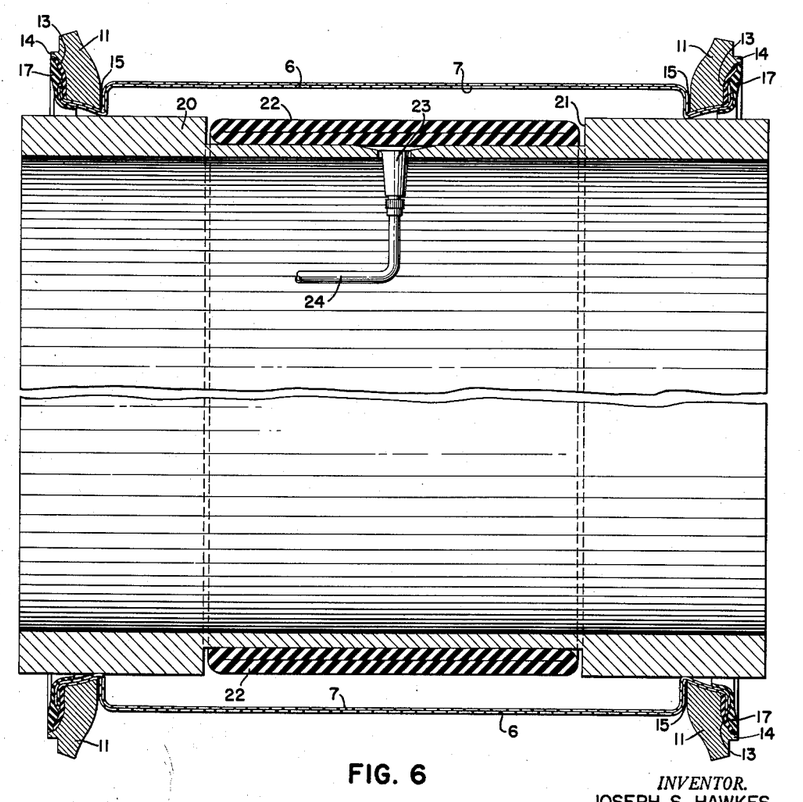
Fig. 6 shows another step in the operation employing a different type of drum which is used in expanding the median portion of the band.

The next step in the operation is to expand the central portion of the diaphragm into substantially an inverted U-shaped cross section and for this purpose a second drum, which will be referred to as a shaping drum 20, is provided for the shaping operation. This drum need only be a rigid cylinder which has a recess 21 centrally thereof to receive an inflatable fabric-reinforced tube 22 provided with an inflation valve 23, which in turn is connected by a suitable pipe line 24 to a source of fluid pressure. The diaphragm, after it has been formed as shown in Fig. 5, is slipped off the drum 2 after collapsing the drum in a manner similar to the manner of removing a tire carcass from a crown tire-building drum. It is thereafter slipped over the surface of the shaping drum 20 into a position such as shown in Fig. 6. Air is then admitted through the pipe line 24 and valve 23 into the inflatable tube 22 which expands radially to push the central part of the diaphragm outwardly into the shape illustrated generally in Fig. 7. This action simultaneously draws the rings 11 inwardly toward the center of the drum. Preferably the air admitted to the inflating tube is admitted under a fixed predetermined pressure and the pressure is left on until the diaphragm is properly expanded. The fabric in the tube 22 prevents expansion beyond the desired amount. Ordinarily this operation takes from three to five minutes time because the cords in the various plies have to assume a different position and must pantograph with respect to each other, as is well understood in the art. In the meantime the operator can be building another diaphragm on the tire-building drum 2.

Figure 8:
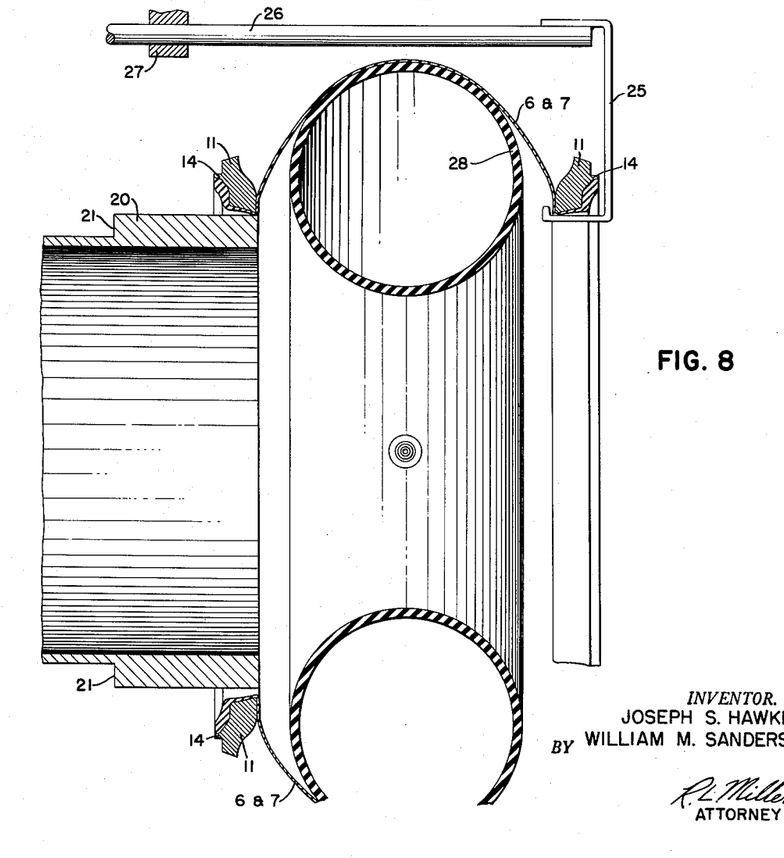
Fig. 8 illustrates the manner in which an air bag is mounted in the diaphragm prior to curing.

The next step is to deflate the inflatable tube 22 to the position it occupies in Fig. 6 and then the diaphragm with the rings is moved to a position adjacent one end of the shaping drum 20 into a position such as shown in Fig. 8, with the ring shown at the left arranged just at the edge of the drum so that it is supported thereby. The other ring at the right is supported by a bracket 25 on the end of a rod 26, which is slidable and rotatable in the bearing 27 so that when not in use it may be moved out of the way of the operator. In Fig. 8, and in the remaining figures, the diaphragm, for simplicity, is merely illustrated schematically as a single layer of material, including the portions forming the outwardly extended beaded edges. After the inside of the diaphragm is dusted to prevent adhesion to the air bag, a suitable air bag 28 is mounted within the diaphragm as illustrated in Fig. 8 in a manner well understood in the art. The diaphragm is then ready for the next step in the operation, which is curing.

The curing is done in a mold that is similar to the usual tire-curing mold but with certain modifications for the proper curing of the diaphragm, particularly the portions of the diaphragm forming the channel which are adapted to receive the beads of the tire. This is true particularly of that portion which goes under the bead and along the outside of the bead in view of the fact that these portions are relatively thin and it is necessary to control the thickness within a few thousandths of an inch in order to get satisfactory results. Certain problems also arise in the curing due to the fact that the channel-forming rings 11, which are put in the mold along with the diaphragm, may be at a different temperature (and generally are) than the temperature of the adjacent portions of the mold, unless some control is used to prevent such a condition. It is therefore necessary to control the initial temperature of the channel-forming rings and of the adjacent mold parts so that, when the diaphragm and the rings are mounted in the mold and are then heated, uniform expansion will take place and the thickness of the channel section will therefore be properly controlled.

If, for instance the base ring section is hot and the channel-forming ring is cold the rubber does not cure properly in the channel portion because the rate of expansion of the two parts is not the same. A blistering or spongy condition will result due to lack of pressure when the forming ring heats up and expands away from the rubber. Furthermore, if the mold portion is hot when the diaphragm is inserted, it is possible that a pinching of the diaphragm may result. In addition, if the base ring portion is hot and expanded at the time the article is placed in the mold, rubber will be scraped off the base of the channel exposing the cords. It has therefore been found necessary to cool the portions of the mold which shape the outer side of the channel section to a temperature which is somewhat the same as the channel-forming ring when the latter, along with the diaphragm, is inserted in the mold.

Figure 9:
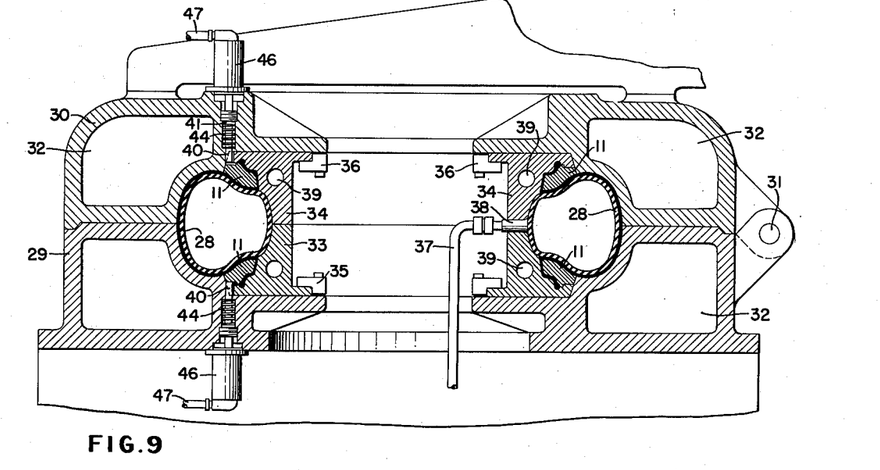
Fig. 9 is a cross section through a mold illustrating the diaphragm in position in the mold for curing purposes.
Figures 10, 14:
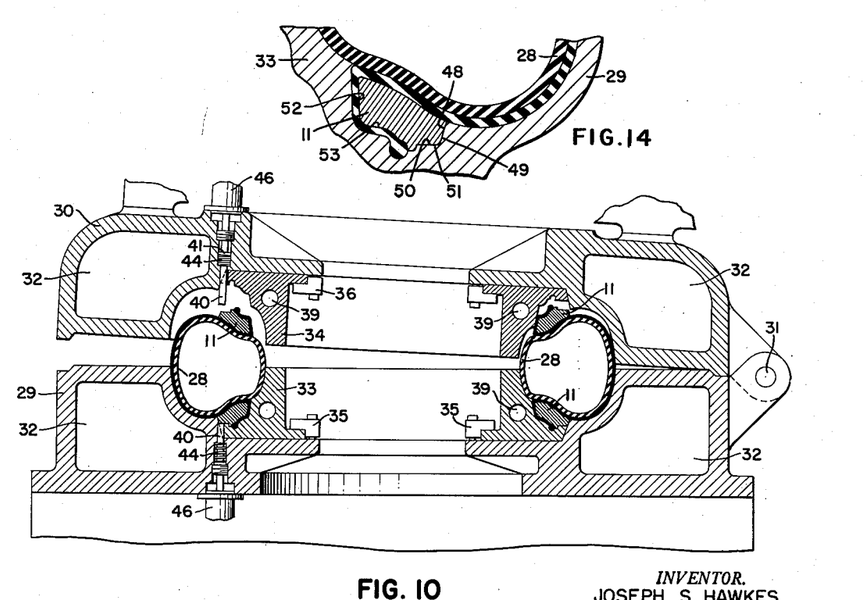
Fig. 10 is a view illustrating the mold in slightly opened position after the curing operation.
Fig. 14 is an enlarged cross section of a portion of the mold and associated parts shown in Fig. 10.
Figure 11:
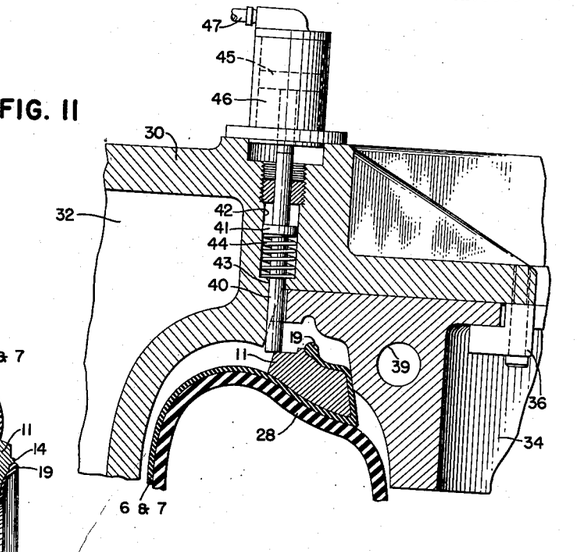
Fig. 11 is an enlarged fragmentary cross section of a detail in Fig. 10.

Referring now to Figs. 9, 10, and 11, particularly, it is to be noted that the mold comprises lower and upper mold sections 29 and 30 pivoted at 31 so that the upper part of the mold can be moved into a position for the loading operation, as is common practice in the tire art. These mold sections are provided with the usual spaces 32 for the reception of a heated curing medium. The inner molding surfaces on the mold sections 29 and 30 are shaped to conform with the arcuate construction desired on the outer portion of the diaphragm from a point about midway of the side walls. The mold is also provided with an inner wall formed by base rings 33 and 34 respectively and these are locked in place in any suitable manner, such as by the brackets 35 and 36. The base rings and the mold sections then form a curing space into which the diaphragm is placed with the channel-forming rings still in position, as illustrated clearly in Fig. 9. It is now only necessary to cure in the normal manner by using a curing medium in the mold spaces 32 and introducing a pressure medium, such as air, into the air bag through a pipe line 37 connected with the valve 38 on the air bag 28.

As seen in Fig. 14, the channel-forming ring 11 has a beveled surface 48 abutting a correspondingly beveled surface 49 on the mold section 29 and an axially facing surface 50 abutting the axially facing surface 51 on the adjacent base ring 33 to locate the ring 11 in fixed relation to the walls of the mold recess with the inner surface 52 and the axially facing surface 53 thereof in definite space relation to the adjacent wall portions of the mold recess to receive and shape one edge of the diaphragm. The other edge of the diaphragm is similarly shaped by the similarly located channel-forming ring 11 which cooperates with the mold section 30 and the base ring 34 in the same manner as do the surfaces 49 and 51 on the channel-forming ring that cooperates with the mold section 29 and the base ring 33. The base rings 33 and 34 together form an inner wall for the mold recess.

The air bag, when inflated, forces the channel-forming rings against the cooperating locating surfaces on the base rings and mold sections and also forces the diaphragm into firm engagement with said rings and adjacent surfaces of the mold recess. In order to heat the base rings, they are formed with one or more passages 39 which extend circumferentially thereof and are connected to any suitable source of heating medium. These same passages 39 are also connected to a source of cooling fluid, such as cold water, and a suitable valve mechanism (not shown) is so arranged as to selectively permit flooding the passages with either the heating or the cooling medium.

The channel-forming rings 11 are taken out of the mold along with the diaphragm and a suitable supply of these rings is kept on hand at each of the operator's stations in order that there will be enough of these rings, if they are used in turn, to allow sufficient time to permit them to cool down to the desired temperature for the next curing operation. These mold rings could be cooled by dipping in a cooling solution but this would mean that the rings would then have to be dried off before being used again. With this arrangement, it is obvious that when the channel-forming rings are applied to the diaphragm in the building steps and the diaphragm and these rings are then placed in the mold, the rings are at substantially room temperature. Just prior to opening of the mold and during the time the mold is open the base rings 33 and 34 are being cooled by the cooling fluid flooding the passages 39. This latter operation is controlled to such an extent that the base rings are also cooled down to substantially room temperature by the time another diaphragm is inserted in the mold.

It is preferred that the channel-forming rings be made of a metal or other substance having a high heat conductivity in order that the time required for heating and cooling these rings is minimized. Aluminum rings or any light-weight rings have the advantage of being light in weight and afford easier handling. Also by employing light-weight rings it is possible to support these rings solely by a layer of cement in the manner illustrated in Fig. 2. It has been found that steel rings, which have a lower heat conductivity, as compared to aluminum, are also too heavy for use due to the fact that their weight will break the bond between these rings and the fabric. Such steel rings could be used if at least portions of the edge of the fabric are brought under the forming rings before the mounting rings are withdrawn. However, one of the most important advantages of using aluminum is its high heat conductivity and consequently the rings will cool down quicker, thus requiring fewer rings at the operator's station.

Also, due to the higher heat conductivity of the aluminum rings, these rings are more quickly heated in the mold by the adjacent heated portions of the mold sections and base rings, thereby insuring a shorter period for curing.

The base rings 33 and 34 are also made of the same material as the channel-forming rings 11 so that when the molding operation is taking place there is uniform expansion of these parts and a consequent better control of the shaping of the channel sections of the diaphragm. As pointed out previously, this control is necessary in view of the necessity of controlling the thickness of the very thin bottom wall in the channel formed in the diaphragm.

The material for forming the base of the channels at the edges of the diaphragm should be of a controlled thickness depending on the relative dimensions of the tire and rim and this dimension is normally about .030" in thickness with present rim and tire construction. This control is necessary in order that the diaphragm, when mounted on a tire, may thereafter be readily mounted on the seats of a rim. If this thickness is too great it is difficult to mount the tire and if it is less than the desired thickness it may not be strong enough to take the strain imparted thereby by the diaphragm when a tire blows out and all of the pressure is acting directly on the diaphragm. Also it is important to insure that the cords in this portion of the diaphragm are adequately covered with rubber and it is also important that in molding the diaphragm. Also it is important to insure that the cords reason that the base rings 33 and 34 and the channel-forming rings 11 have their temperatures controlled to insure this result. To begin with, both the base rings and the channel-forming rings are so proportioned that, when at the curing temperature employed, the clearance between the base rings and the channel-forming rings is equal to the thickness desired for the bases of the channels in the diaphragm or approximately .030". As will be apparent from the previous description, when the channel-forming rings are out of the mold they cool down and are purposely cooled down so as to make them suitable for handling and to prevent premature curing of the rubber with which they come into contact in the building operation. In their cool state the diameter of the ring is less than the diameter when the ring is heated. Therefore if the base ring is not cooled when the diaphragm and channel-forming rings are placed in the mold there will not be enough space between the two for the reception of the material in the diaphragm at the base of the channel-forming ring. This would result in damaging this portion of the diaphragm, either by scraping the rubber from the fabric or by cutting the cords or by jamming the cords to such an extent that the diaphragm will not be found satisfactory. It may even prevent proper seating of the channel-forming rings. However, if the base rings are also cooled down their outer diameters are, of course, reduced and the proper clearance between the base rings and the channel-forming rings is provided to permit proper mounting of the diaphragm and channel-forming rings in the mold itself without damage to the bases of the channels. Thereafter on the heating of the base rings and the channel-forming rings, they will both expand and maintain the proper distance for the proper forming of the bases of the channels in the diaphragm. The mold sections themselves are always kept hot by the curing medium and a sufficient clearance is provided in the recesses in the mold that receive the channel-forming rings to permit the expansion of the channel-forming rings when the latter are heated.

In the curing operation the channel-forming rings are heated primarily by the heat imparted to the base rings and channel-forming rings and therefore it has been found desirable to heat the base rings to a higher temperature than the mold sections. In a typical example the mold rings are heated to a temperature of 340° F. and the mold sections are maintained at a temperature of 315°. Thus it will be seen that provision has been made for rapidly heating the channel-forming rings to a sufficient temperature for curing purposes so as to properly cure the channels in the diaphragm. It must be borne in mind that the base rings are not heated until after the diaphragm has been inserted, or at least this operation should not be started until just shortly prior because if the base rings start to expand before the channel-forming rings are in place damage will result to the diaphragm. Also, since the channel-forming rings receive their heat principally from the base rings, aluminum rings, or rings having a high-heat conductivity, should be used so that the expansion of the base rings and channel-forming rings is at substantially the same rate, as otherwise there could be a thinning of the bottom of the diaphragm channels.

After the proper cure has been effected the mold is opened generally by suitable timing mechanism common in the art and at this time it is important that the channel-forming rings 11 be freed from the base rings 33 and 34. In order to accomplish this, knock-out pins are provided such as shown in detail in Fig. 11. These knock-out pins 40 have collars 41 which slide in a cylindrical opening 42 in the mold half, the pin itself passing through a reduced opening 43 at one end of the opening 42. A coiled spring 44 is arranged between the collar 41 and the end of the opening 42 so that the pin is normally urged in a direction away from the mold cavity. The outer end of the pin carries a piston 45 operating in a cylinder 46 connected by a conduit such as 47 to a suitable source of fluid pressure whereby, when desired, this fluid pressure can be introduced into the cylinder 46 to move the piston against the action of the spring 44 to thus move the pin into engagement with the channel-forming ring 11. A suitable control mechanism is provided to regulate the timing of the fluid flow through the supply conduit 47 to operate the knock-out device at the time, or slightly after, the mold starts to open. This causes the knock-out pin to engage the ring 11 and free it from the base ring 34. Subsequently, or even at the same time, a similar knock-out device in the lower section of the mold is operated in a similar manner to free the channel-forming ring from the base ring 33. This is important because in the absence of such means the channel-forming rings would stick in the base rings and, as the mold sections moved apart, the diaphragm would be stretched and destroyed, or at any rate badly damaged.

After this operation has been completed the diaphragm and the channel-forming rings are removed from the mold by the operator. The diaphragm is then stripped from the channel-forming rings and thereafter the diaphragms are further processed and inspected in a manner similar to other rubber products after they have been removed from the mold.

Figure 13:
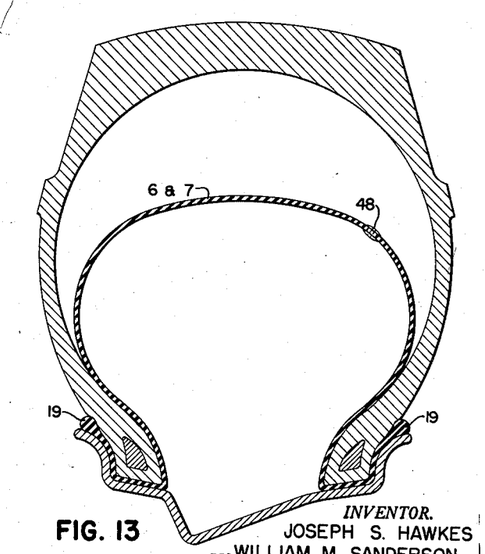
Fig. 13 is an enlarged cross-sectional view illustrating the diaphragm and tire on a rim.

In one stage of this latter process a metal grommet 48, shown in Fig. 13, having a small passage of about .042" in diameter, is inserted in an opening formed in the diaphragm after cure. This permits a slow leakage of air from the inner chamber formed by the diaphragm and rim in the event of failure of the tire, as in the case of a blowout.

Essentially the process consists, first in forming, on a tire drum or the like, a single or multiple ply band of cord fabric of a controlled width, next, turning the ends of the band or bands inwardly at substantially right angles to the cylindrical walls of the band, next mounting the channel-forming rings on these inturned portions and sustaining them in that position preferably by a thin layer of cement initially placed on the rings, and then finally turning the edges of the band axially outward and then radially outward around the lower and outer surfaces of the channel-forming rings themselves.

Figure 7:
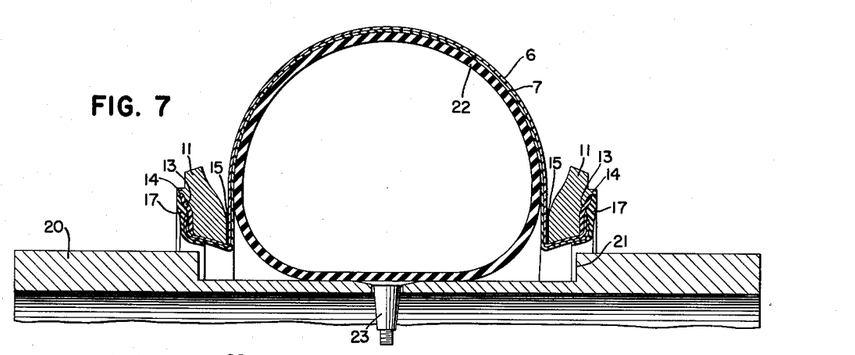
Fig. 7 is similar to Fig. 6 showing the band expanded.

After this building operation in which the various elements of the diaphragm are assembled the diaphragm is shaped by expanding the middle portion thereof, as in Fig. 7, next, mounting an airbag within the diaphragm, next, inserting the diaphragm with the channel-forming rings in place in the mold and, after curing, removing the diaphragm and channel-forming rings from the mold after the diaphragm and the channel-forming rings are freed from the mold by the knock-out devices provided in the mold sections.

Subsequently the rings are stripped from the diaphragm, the diaphragm is provided with a grommet and the diaphragm is inspected and any flash is removed in a manner similar to methods employed with other molded objects after they have been removed from the mold.

By this method the dimensions of the diaphragm are controlled within close tolerances that assure that the channel portions, particularly at the base, are of the desired thickness, and that an adequate amount of rubber is positioned over the ends of the cords.

While certain representative embodiments and details have been shown for the purpose of illustrating the invention, it will be apparent to those skilled in this art that various changes and modifications may be made therein without departing from the spirit or scope of the invention.

Having thus fully described this invention, what we claim and desire to secure by Letters Patent of the United States is:

1. The method of forming and vulcanizing an annular flat band of vulcanizable material to form a band with generally U-shaped channels at the edges thereof and with an intermediate arched central portion, comprising the steps of wrapping the edges of an annular flat band around the inner peripheries and outside faces of annular channel-forming rings positioned adjacent the edges of said band, expanding said band intermediate said rings, vulcanizing the band while the rings are so positioned and then stripping the band from the rings to provide the edges with open channels for the reception of tire beads.

2. The method of forming and vulcanizing an annular flat band of vulcanizable material to form a band with generally U-shaped channels at the edges thereof and with an intermediate arched central portion, comprising the steps of turning the lateral edges of said bands radially inward, positioning an annular channel-forming ring against each inturned edge, wrapping the edges of an annular flat band around the inner peripheries and outside faces of said annular channel-forming rings, expanding said band intermediate said rings, vulcanizing the band while the rings are so positioned and then stripping the bands from the rings to provide the edges with open channels for the reception of tire beads.

3. The method of forming and vulcanizing an annular flat band of vulcanizable material to form a band with generally U-shaped channels at the edges thereof and with an intermediate arched central portion, comprising the steps of turning the lateral edges of said bands radially inward, positioning an annular channel-forming ring against each inturned edge, wrapping the edges of an annular flat band around the inner peripheries and outside faces of said annular channel-forming rings expanding said band intermediate said rings, inserting an inflatable air bag in said expanded portion of the band, vulcanizing the band while the rings are so positioned and then stripping the bands from the ring to provide the edges with open channels for the reception of tire beads.

4. The method of forming and vulcanizing annular diaphragms having bead-receiving channels at the edges thereof for the reception of the beads on a tire comprising the steps of forming an annular band of vulcanizable rubberized material, turning the edges of the band radially inward toward the axis of the band, positioning annular channel-forming members of less internal diameter than the outer diameter of the band, against the inturned edges thereof, wrapping each of the free edges of the band against the inner annular surface of the adjacent members and the outwardly facing surfaces of said members and then vulcanizing the band with said members so positioned whereby to form generally U-shaped channels in the band at the edges thereof and then stripping the bands from the rings.

5. The method of forming and vulcanizing an annular flat band into a band with generally U-shaped channels at the edges thereof and with an intermediate arched central portion comprising the steps of forming an annular band of vulcanizable material, providing each of two substantially rigid annular channel-forming rings with a strip of rubber releasably adhered to its outer axially facing surfaces, positioning said rings, one near each edge of said band and with the rubber-covered surfaces of said rings facing axially outward from the center of the band, wrapping the edges of the bands around the inner peripheries of said rings and upwardly against the rubber-covered outer axially facing surfaces thereof in adhering relation therewith, covering said edges by adhering strips of rubber over said edges, expanding the band intermediate the edges, vulcanizing the band while the rings are so positioned and then stripping the bands from the rings to provide the edges with open channels for the reception of tire beads and with the strips covering the edges of the band.

6. The method of forming and vulcanizing an annular flat band into a band with generally U-shaped channels at the edges thereof and with an intermediate arched central portion comprising the steps of forming an annular band of vulcanizable material, turning the lateral edges thereof inwardly, providing each of two substantially rigid annular channel-forming rings with a strip of rubber releasably adhered to its outer axially facing surfaces, positioning said rings, one near each inturned edge of said band in adhering engagement therewith and with the rubber-covered surfaces of said rings facing axially outward from the center of the band, wrapping the edges of the bands around the inner peripheries of said rings and upwardly against the rubber-covered outer axially facing surfaces thereof in adhering relation therewith, covering the outer surfaces of said edges by adhering additional strips of rubber over said edges, expanding the band intermediate the edges, vulcanizing the band and the strips to the band while the rings are so positioned and then stripping the bands from the rings to provide the edges with open channels for the reception of tire beads and with the strips covering the edges of the band.

7. The method set forth in claim 6 which comprises positioning each of said first strips of rubber on its respective ring and in positioning said rings at such a position with respect to the adjacent edges of the band that when the edges are turned up around the rings, said edges overlie substantially less than the full width of said first strips, thus leaving an exposed portion on each first strip radially outward of the said edges, and in which the second rubber strips are applied in a manner to overlie both the said edges and said first strips.

8. An apparatus for molding a diaphragm from a rubberized fabric band to form channels at the opposite edges thereof and a connecting intermediate arcuate portion, comprising at least two separable mold sections which when assembled for molding purposes form an annular space comprising a circumferentially extending outer wall, a circumferentially extending inner wall facing said outer wall and lateral walls joining said outer and inner walls, and two channel-forming rings for forming channels in the edges of said band and shaping the lateral edges thereof, each of the lateral walls of said space having means cooperating with means on one of said channel-forming rings to positively locate the ring in fixed relation to that lateral wall, said ring having a cross-section such that when the ring is so located, other portions of said ring will be spaced from the adjacent portions of the lateral wall and inner wall a distance to define grooves of the required cross-section to shape the lateral edges of a band wrapped about said channel-forming rings at the inner circumferential and outer lateral faces of said ring, and the outer wall of the mold together with the lateral walls of the mold and the inner opposed walls of the channel-forming rings constituting means for shaping the intermediate portion of said band when a pressure medium in said space is applied to urge said intermediate portion of said band against said walls.

9. An apparatus as set forth in claim 8 in which the inner wall and the adjacent channel-forming rings are each made of a material that has a high heat conductivity and have substantially the same expansion and contraction characteristics.

10. An apparatus as set forth in claim 9 in which the material of said inner wall and channel-forming rings is aluminum.

11. An apparatus as set forth in claim 8 in which the inner wall is provided with passageways for selectively receiving a cooling or heating medium.

12. An apparatus for molding a diaphragm from a rubberized fabric band to form an annular band arcuate in cross section with channels at the opposite edges thereof, comprising at least two mold sections forming a substantially annular recess having spaced axially facing walls and inner and outer radially spaced walls, two channel-forming rings adapted to be positioned within said recess, one at each of the opposite axially spaced walls thereof, the axially outwardly facing sides of each said channel-forming ring having a locating surface cooperating with a mating locating surface on the adjacent axially facing wall for positively locating the channel-forming rings in said recess, the inner circumference of each channel-forming ring and the contiguous axially outward facing surface thereof being so dimensioned as to be spaced respectively from the adjacent walls of said recess when said rings are located in said recess with their locating surfaces in engagement with the respective locating surfaces on the axially facing walls of the recess.

13. An apparatus as set forth in claim 12 in which the channel-forming rings and the adjacent walls of said recess are each made of a material having a high heat conductivity and substantially the same expansion and contraction characteristics.

14. An apparatus as set forth in claim 13 in which the material of said channel-forming rings and the adjacent portions of said mold is aluminum.

References Cited in the file of this patent

UNITED STATES PATENTS

| | | |
|---|---|---|
| 1,989,363 | Iverson | Jan. 29, 1935 |
| 2,476,884 | Maynard | July 19, 1949 |
| 2,569,935 | Leguillon et al. | Oct. 2, 1951 |
| 2,605,195 | Boughton | July 29, 1952 |
| 2,614,056 | Kraft | Oct. 14, 1952 |
| 2,649,892 | Appleby | Aug. 25, 1952 |
| 2,665,967 | Bean et al. | Jan. 12, 1954 |
| 2,713,382 | Bosomworth et al. | July 19, 1955 |
| 2,726,925 | Saulino | Dec. 13, 1955 |
| 2,791,805 | White | May 14, 1957 |
| 2,808,621 | Torrey | Oct. 8, 1957 |
| 2,835,921 | White | May 27, 1958 |

UNITED STATES PATENT OFFICE
CERTIFICATE OF CORRECTION

Patent No. 2,983,954                                May 16, 1961

Joseph S. Hawkes et al.

It is hereby certified that error appears in the above numbered patent requiring correction and that the said Letters Patent should read as corrected below.

Column 6, line 41, for "diaphragm. Also it is important to insure that the cords" read -- diaphragm the cords are not damaged. It is for this --.

Signed and sealed this 17th day of October 1961.

(SEAL)
Attest:

ERNEST W. SWIDER                              DAVID L. LADD
Attesting Officer                                 Commissioner of Patents

USCOMM-DC